(12) United States Patent
Hasegawa et al.

(10) Patent No.: US 6,237,676 B1
(45) Date of Patent: May 29, 2001

(54) HEAT EXCHANGER FOR VEHICLE AIR CONDITIONER

(75) Inventors: Etuo Hasegawa, Nagoya; Michiyasu Yamamoto, Chiryu; Yoshifumi Aki, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/299,201

(22) Filed: Apr. 23, 1999

(30) Foreign Application Priority Data

Apr. 28, 1998 (JP) .................................................. 10-119074
Jun. 11, 1998 (JP) .................................................. 10-163887

(51) Int. Cl.⁷ ....................................................... F28F 9/00
(52) U.S. Cl. ............................... 165/67; 165/41; 165/149; 165/77; 165/140; 180/68.4
(58) Field of Search ................................ 165/41, 67, 149, 165/140, 77; 180/68.4

(56) References Cited

U.S. PATENT DOCUMENTS

| | | | | |
|---|---|---|---|---|
| 4,066,119 | * | 1/1978 | Stedman .............................. | 165/67 X |
| 4,531,574 | * | 7/1985 | Hoch ...................................... | 165/67 |
| 5,000,257 | * | 3/1991 | Shinmura .............................. | 165/67 X |
| 5,429,181 | * | 7/1995 | Tordjeman .............................. | 165/67 |
| 5,535,819 | * | 7/1996 | Matsuura .............................. | 165/149 |
| 5,992,514 | * | 11/1999 | Sugimoto et al. ................ | 165/149 X |
| 6,000,460 | * | 12/1999 | Yamanaka et al. ..................... | 165/67 |

FOREIGN PATENT DOCUMENTS

| | | |
|---|---|---|
| 4-52498 | 2/1992 | (JP) . |
| U-4-100685 | 8/1992 | (JP) . |

* cited by examiner

*Primary Examiner*—Christopher Atkinson
(74) *Attorney, Agent, or Firm*—Harness, Dickey & Pierce, PLC

(57) ABSTRACT

A double heat exchanger including a radiator and a condenser for an air conditioner is mounted on a vehicle through first and second brackets. When the radiator is detached from the vehicle, a bolt for securing a side plate of the radiator to the second bracket is removed firstly, and the radiator is inclined in a front-rear direction of the vehicle. Thereafter, the radiator is pulled upwardly to be detached from the first bracket. When the radiator is attached to the vehicle, a first extending portion of the side plate of the radiator is inserted between first and second holding portions of the first bracket. In this state, the radiator is moved to contact an inclining member of the first bracket, and is fastened to the second bracket through the bolt. Thus, the radiator is readily detached from and attached to the vehicle and requires a small mounting space.

5 Claims, 15 Drawing Sheets

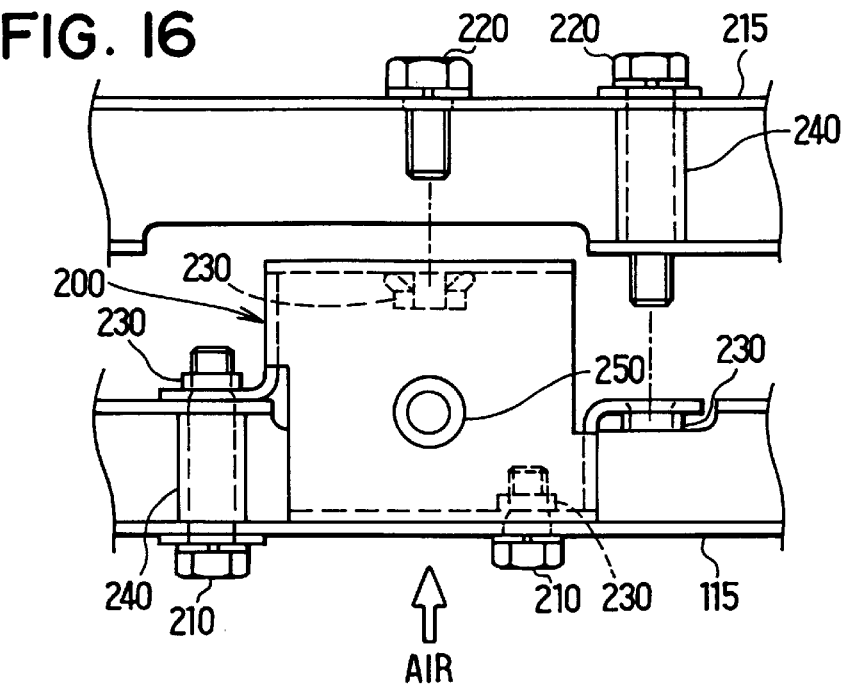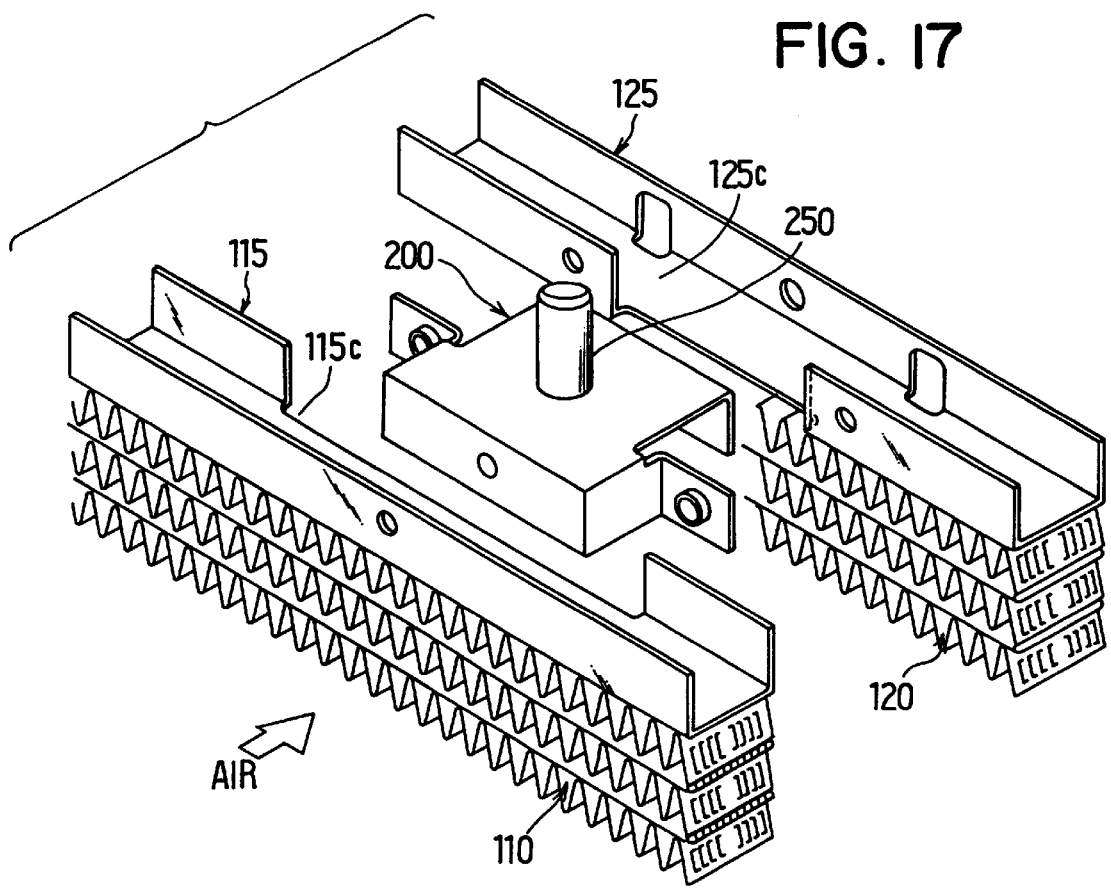

US 6,237,676 B1

HEAT EXCHANGER FOR VEHICLE AIR CONDITIONER

CROSS REFERENCE TO RELATED APPLICATION

This application relates to and claims priority from Japanese Patent Applications No. Hei. 10-119074 filed on Apr. 28, 1998 and No. Hei. 10-163887 filed on Jun. 11, 1998, the contents of which are hereby incorporated by reference.

BACKGROUND OF THE INVENTION

1. Field of the Invention

The present invention relates to a securing structure of a heat exchanger mounted on a vehicle. The present invention is suitable for a heat exchanger including a condenser for a refrigerant cycle of a vehicle air conditioner and a radiator for cooling an engine cooling water, disposed closely or integrally with each other.

2. Related Art

JP-A-9-257388 discloses a securing structure (i.e., mounting structure) for securing a double heat exchanger to a vehicle, by the applicant of the present invention. In JP-A-9-257388, the double heat exchanger includes a radiator and a condenser integrally connected to each other by upper and lower brackets. The double heat exchanger is mounted on and secured to the vehicle to be pinched between attachment members of the vehicle in a vertical direction. Therefore, even when only the radiator needs to be detached from the vehicle, the connected radiator and condenser need to be detached from the vehicle. That is, first, the connected radiator and condenser are disconnected from the attachment members of the vehicle and moved in a front-rear direction of the vehicle. Then, bolts fastening the brackets to the radiator are loosened, thereby detaching the radiator from the bracket. When the radiator is attached to the vehicle again, the above-mentioned detachment steps need to be performed in a reversed order. Thus, the condenser and the radiator are not effectively detached and attached. Further, an extra space (i.e., dead space) for moving the connected condenser and radiator in the front-rear direction of the vehicle is required in the vehicle, thereby increasing a mounting space of the double heat exchanger.

Further, in the conventional double heat exchanger, a side plate is attached to each of upper and lower end surfaces of the radiator and the condenser for reinforcement, and the brackets are attached to both the side plates of the radiator and the condenser to cover the side plates. Therefore, when either the radiator or the condenser needs to be detached from the vehicle for repair or replacement, only one of the radiator and the condenser cannot be detached from the vehicle, but both the radiator and the condenser need to be once detached from the vehicle. For example, even when only the condenser needs to be detached from the vehicle, both of the radiator and the condenser need to be detached from the vehicle. Therefore, engine-cooling water is necessary to be removed from the radiator, thereby reducing maintenance efficiency of the double heat exchanger.

SUMMARY OF THE INVENTION

In view of the foregoing problems, it is an object of the present invention to provide a heat exchanger which is readily detached from and attached to a vehicle and requires a small mounting space.

It is an another object of the present invention to provide a heat exchanger mounted on a vehicle in which maintenance is readily performed.

According to the present invention, a heat exchanger is mounted on a vehicle having two attachment members extending in a vehicle width direction. First and second plate members of the heat exchanger are attached to the attachment members through first and second brackets. The first bracket has a bracket main portion, an inclining member for inclining the heat exchanger in a front-rear direction of the vehicle, and an engaging unit through which the heat exchanger engages with the first bracket. The second bracket has a restricting unit for restricting the heat exchanger from inclining when the heat exchanger is attached to the vehicle. Thus, when the heat exchanger is detached from the vehicle, the heat exchanger is firstly released from the restricting unit, is inclined through the first bracket, and is pulled upwardly. When the heat exchanger is attached to the vehicle, detachment steps are simply performed in reverse. Thus, the heat exchanger is readily detached from and attached to the vehicle and requires a small mounting space.

Preferably, the first plate member includes a first extending portion extending toward the first bracket, the inclining member has a first holding portion which is moved together with the first extending portion to be inclined, and the bracket main portion has a second holding portion at a side opposite to the first holding portion relative to the first extending portion, so that the first extending portion is sandwiched between the first and second holding portions. Further, the second holding portion contacts the first extending portion when the restricting unit restricts the core portion from inclining, and the engaging unit is provided at least one of the first and second holding portions. Thus, the heat exchanger is readily inclined when the restricting unit is released, while the first and second attachment members are secured to the vehicle. As a result, the heat exchanger is readily detached from and attached to the vehicle in a small mounting space of the vehicle.

More preferably, the heat exchanger includes a first heat exchanging portion and a second heat exchanging portion disposed at a downstream air side of the first heat exchanging portion. A first side plate attached to the first heat exchanger and a second side plate attached to the second heat exchanger are connected to the second bracket through first and second bolts, respectively. When the first bolt is removed, the first side plate and the first heat exchanging portion can be moved toward an upstream air side of the second bracket. When the second bolt is removed, the second side plate and the second heat exchanging portion can be moved toward a downstream air side of the second bracket. Thus, only one of the first and second heat exchanging portions can be solely detached from the vehicle, thereby improving maintenance efficiency of the heat exchanger.

BRIEF DESCRIPTION OF THE DRAWINGS

This and other objects and features of the present invention will become more readily apparent from a better understanding of the preferred embodiments described below with reference to the accompanying drawings, in which:

FIG. 16 is a top view showing the radiator detached from the condenser and the bracket according to the fourth embodiment;

FIG. 17 is a disassembled perspective view showing a radiator, a condenser and a bracket according to a fifth preferred embodiment of the present invention;

DETAILED DESCRIPTION OF THE PREFERRED EMBODIMENTS

Preferred embodiments of the present invention are described hereinafter with reference to the accompanying drawings.

A first preferred embodiment of the present invention will be described with reference to FIGS. 1–8. In the first embodiment, the present invention is typically applied to a double heat exchanger composed of a radiator and a condenser disposed on a front side of a vehicle.

Figure 1:
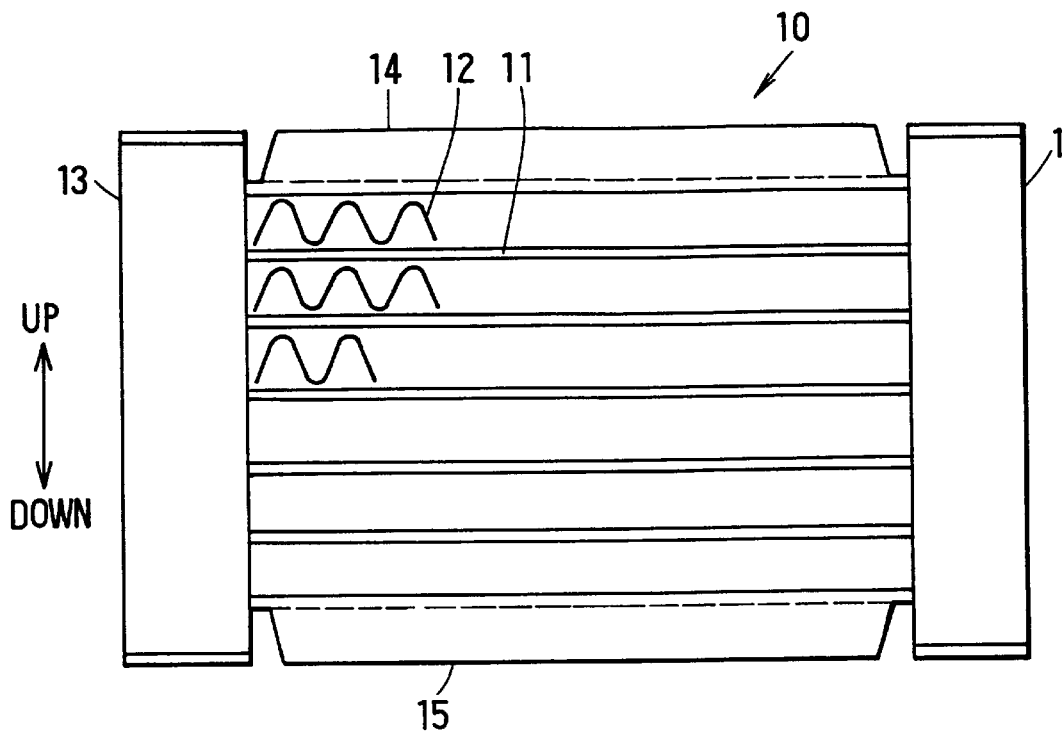
FIG. 1 is a schematic front view showing a radiator according to a first preferred embodiment of the present invention.

As shown in FIG. 1, a radiator 10 for performing heat exchange between cooling water for cooling an engine of the vehicle and air passing through the radiator 10 has plural flat tubes 11 through which cooling water flows and plural fins 12. The fins 12 are disposed between adjacent flat tubes 11 and facilitate heat exchange between cooling water and air. The tubes 11 and the fins 12 are laminated so that a substantially rectangular radiator core is formed.

A pair of tanks 13 are connected to each longitudinal end of the tubes 11 to communicate with the tubes 11. The tank 13 on the left side in FIG. 1 distributes cooling water to each of the tubes 11. Cooling water having performed heat exchange with air is collected into the tank 13 on the right side in FIG. 1.

Figure 3:
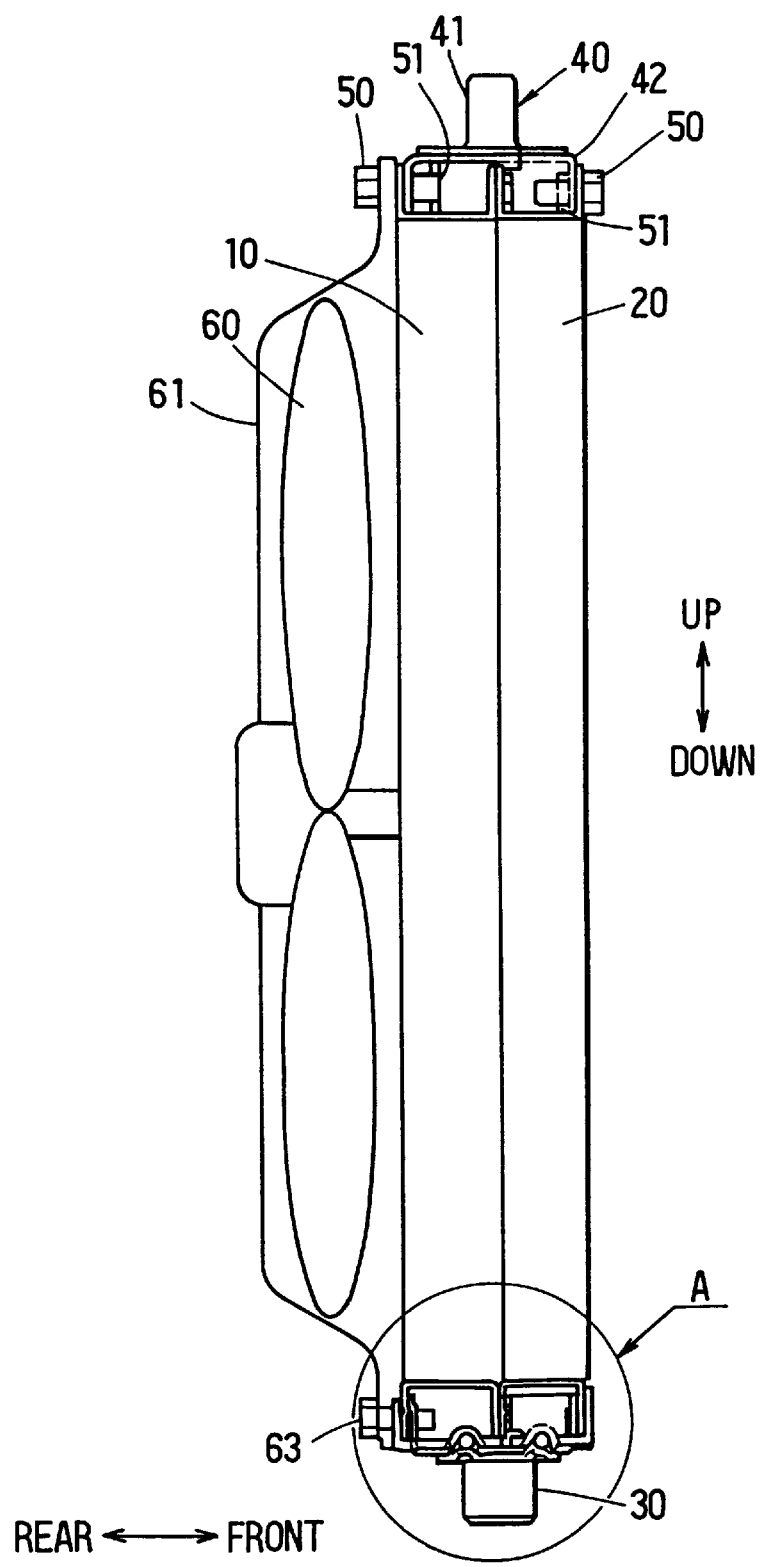
FIG. 3 is a schematic view showing a securing state of the radiator and the condenser when being mounted on a vehicle according to the first embodiment.

Further, side plates 14, 15 for reinforcing the radiator core are respectively disposed on upper and lower end surfaces of the radiator core, and extend in a longitudinal direction of the tubes 11. Each of the side plates 14, 15 has a U-shaped cross-section, as shown in FIG. 3. The tubes 11, the fins 12, the tanks 13 and the side plates 14, 15 are integrally connected with each other through brazing.

Figure 2:
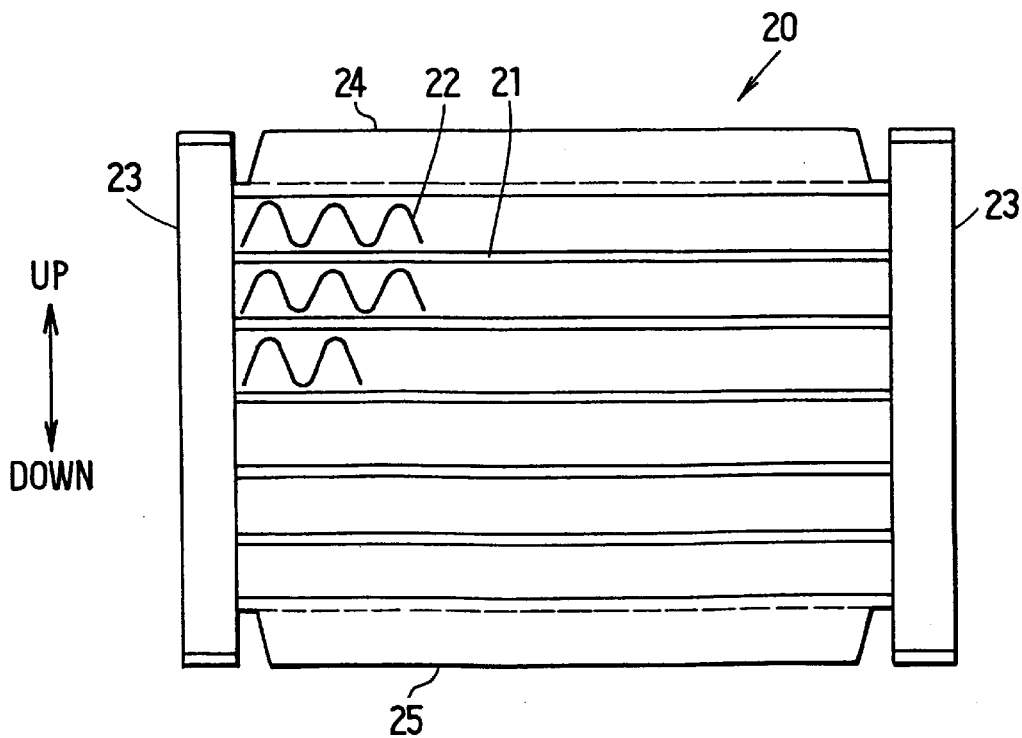
FIG. 2 is a schematic front view showing a condenser according to the first embodiment.

Referring to FIG. 2, a condenser 20 has a structure similar to that of the radiator 10. That is, the condenser 20 has plural tubes 21 through which refrigerant of a refrigerant cycle flows, plural fins 22 between adjacent tubes 21, a pair of tanks 23 for distributing refrigerant into the tubes 21 and for joining refrigerant from the tubes 21, and side plates 24, 25 for reinforcing a condenser core of the condenser 20. Each of the side plates 24, 25 is also formed to have a U-shaped cross-section.

Next, a securing structure of the radiator 10 and the condenser 20 will be described. As shown in FIG. 3, the lower ends of the radiator 10 and the condenser 20, i.e., the side plates 15, 25, are attached and secured to a lower attachment member (not shown) of the vehicle through a first bracket 30. On the other hand, the upper ends of the radiator 10 and the condenser 20, i.e., the side plates 14, 24, are attached to an upper attachment member of the vehicle through a second bracket 40. In the first embodiment, two of the first brackets 30 and two of the second brackets 40 are used. Each of the upper and lower attachment members made of strengthened material is formed into a beam-like shape and extends in a vehicle width direction. The first and second brackets 30, 40 are respectively attached and secured to the lower and upper attachment members through an elastic member such as antivibration rubber (not shown).

The side plates 14, 15 of the radiator 10 have similar structures as those of the side plates 24, 25 of the condenser 20. Therefore, the securing structure of the double heat exchanger according to the first embodiment will be described with respect to the side plates 14, 15 of the radiator 10.

Figure 4:
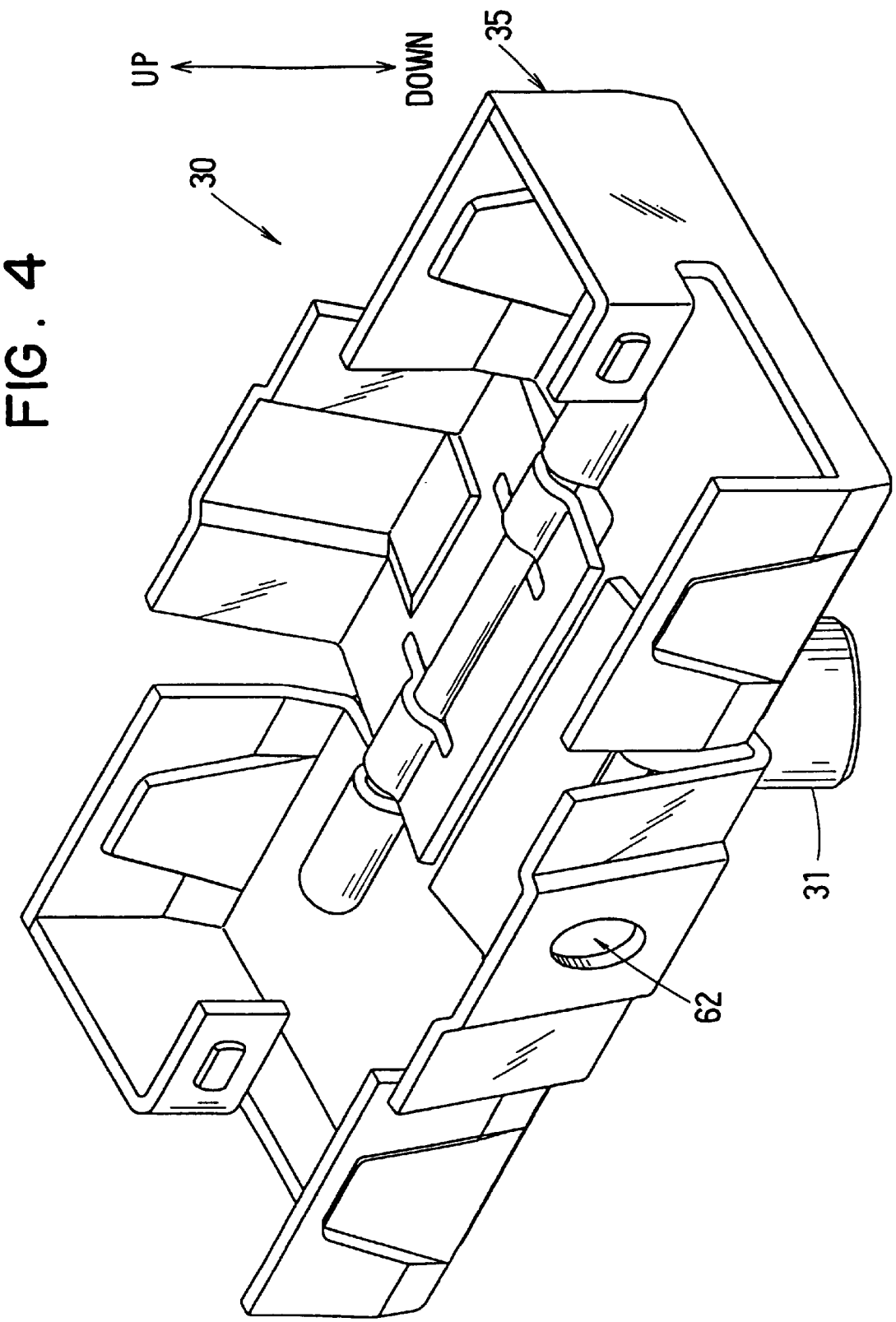
FIG. 4 is a perspective view showing a first bracket according to the first embodiment.
Figure 5:
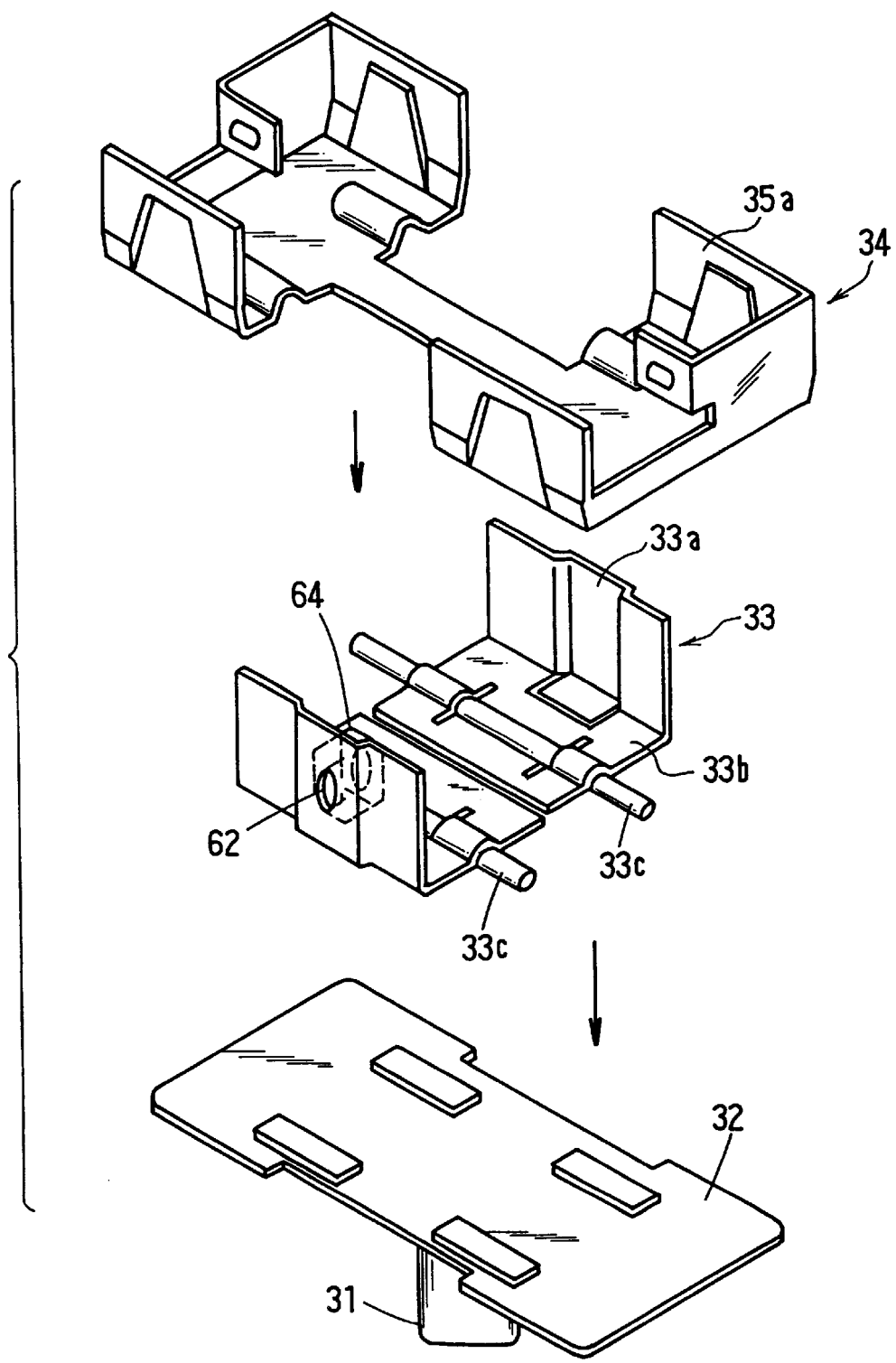
FIG. 5 is a disassembled perspective view showing the first bracket according to the first embodiment.

As shown in FIGS. 4, 5, the first bracket 30 includes a base plate 32, an inclining member 33 and a holding member 34. The base plate 32 has a pin 31 to be inserted into the elastic member. The inclining member 33 has a pair of shafts 33c, and can be moved in a front-rear direction of the vehicle thereby enabling the radiator 10 and the condenser 20 to be inclined in the front-rear direction of the vehicle. Further, the shafts 33c are sandwiched between the holding member 34 and the base plate 32 when the first bracket 30 is assembled, so that the inclining member 33 is attached to the base plate 32 to be inclined in the front-rear direction.

Each of the base plate 32 and the holding member 34 is formed from a metal plate such as a rolled steel plate through pressing. The base plate 32 and the holding member 34 are welded to be connected to each other. As shown in FIG. 4, hereinafter, a welded assembly of the base plate 32, the inclining member 33 and the holding member 34 is referred to as a bracket main portion 35.

Figure 6:
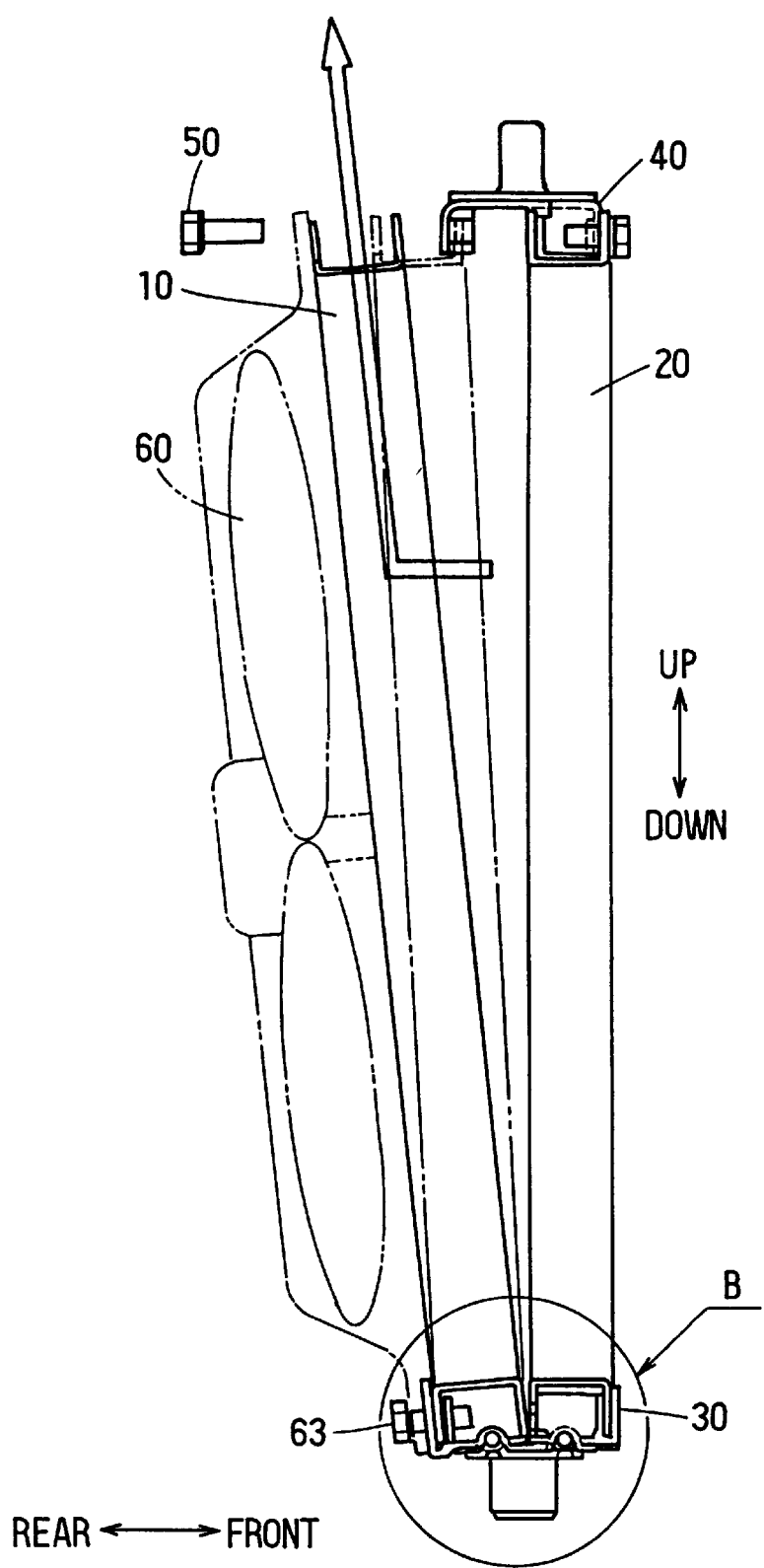
FIG. 6 is a schematic view showing the radiator and the condenser attached to brackets when the radiator is inclined according to the first embodiment.
Figure 7A:
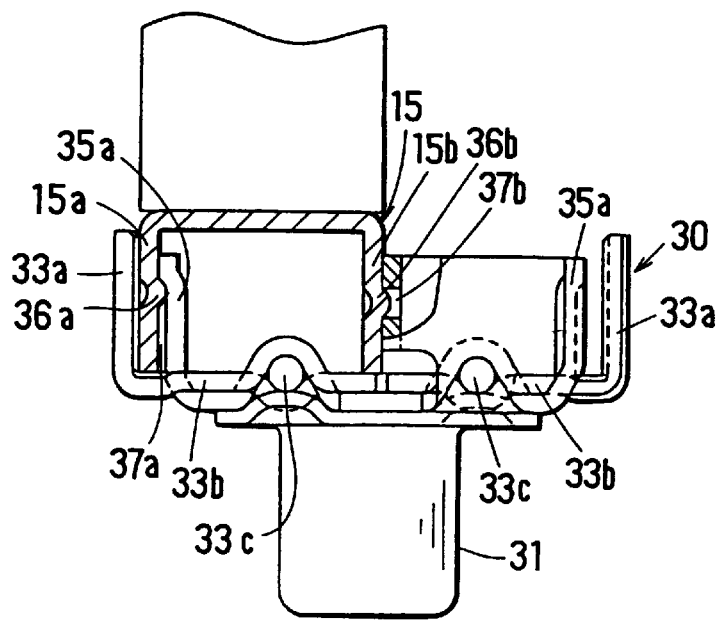
FIG. 7A is an enlarged sectional view showing the portion A in FIG. 3.
Figure 7B:
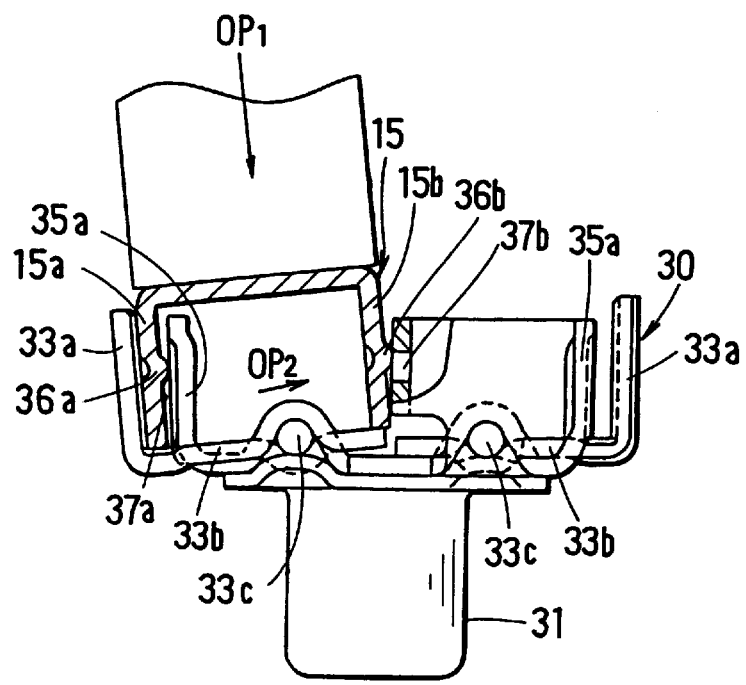
FIG. 7B is an enlarged sectional view showing the portion B in FIG. 6.
Figure 8:
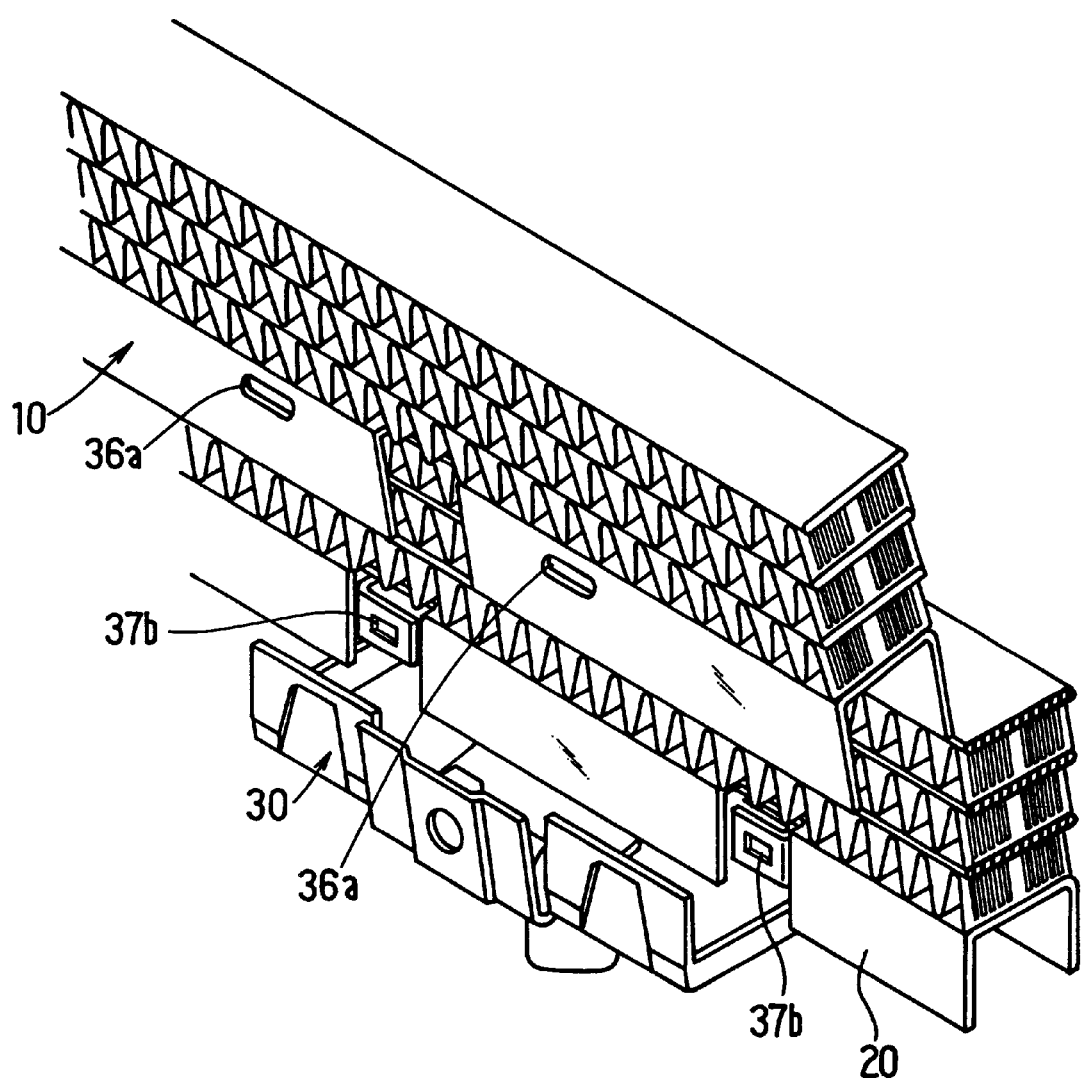
FIG. 8 is a perspective view showing the inclined radiator according to the first embodiment.

Referring to FIGS. 6, 7A, 7B, the side plate 15 of the radiator 10 has first and second extending portions 13a, 13b which correspond to both side portions of the U-shaped cross-section of the side plate 15. The side plate 15 is bonded to the radiator core so that an opening of the U-shaped cross-section of the side plate 15 faces the first bracket 30. Therefore, the first and second extending portions 15a, 15b extend toward the base plate 32 of the first bracket 30.

On the other hand, the inclining member 33 has a first holding portion 33a, a sandwiched portion 33b and the shafts 33c. The first holding portion 33a extends in parallel with the first extending portion 15a. The sandwiched portion 33b is formed to be perpendicular to the first holding portion 33a, and extends toward the second extending portion 15b. The shafts 33c are secured to the sandwiched portion 33b. The first holding portion 33a and the sandwiched portion 33b are integrally formed from a metal plate such as rolled steel plate through pressing. As shown in FIG. 4, the first holding portion 33a is naturally inclined with respect to a vertical direction when the radiator 10 is detached from the first and second brackets 30, 40.

Further, as shown in FIGS. 5, 7A, 7B, the holding member 34 has a second holding portion 35a. The first extending portion 15a is sandwiched between the first holding portion 33a and the second holding portion 35a. The first extending portion 15a has a protruding portion 36a formed by embossing. The second holding portion 35a has a groove 37a to engage with the protruding portion 36a of the first extending portion 15a. Further, the holding portion 34 has an engaging hole 37b at a position displaced from the second holding portion 35a toward the second extending portion 15b in parallel. A protruding portion 36b is formed through embossing on the second extending portion 15b to engage with the engaging hole 37b.

On the other hand, as shown in FIG. 3, the second bracket 40 includes a pin 41 to be inserted into the elastic member and a bracket main portion 42 having a U-shaped cross-section. The pin 41 is connected to the bracket main portion 42. A nut portion 51 is welded to the bracket main portion 42. A bolt 50 is screwed to the nut portion 51 to be engaged thereto.

Referring to FIG. 3, a blower 60 for blowing air toward the radiator 10 and the condenser 20 is attached to the first and second brackets 30, 40 through a shroud 61 made of resin. Referring to FIG. 5, the inclining member 33 has a bolt hole 62 and a nut portion 64. A bolt 63 shown in FIG. 3 is inserted into the bolt hole 62 and connected with the nut portion 64, thereby fastening the shroud 61 to the first bracket 30.

Next, a detachment method for detaching the radiator 10 from the first and second brackets 30, 40 and an attachment method for attaching the radiator 10 to the first and second brackets 30, 40 will be described.

1. DETACHMENT OF RADIATOR

First, the bolt 50 is removed from the second bracket 40. Therefore, the radiator 10 can be moved to be inclined in the front-rear direction of the vehicle due to the inclining member 33 of the first bracket 30. At this time, when the radiator 10 is inclined toward the vehicle rear side as shown in FIGS. 6, 7B, the protrusion portions 36a, 36b of the side plate 15 are respectively released form the engaging groove 35a and the hole 37b. As a result, when the radiator 10 is pulled upwardly, the radiator 10 is readily detached from the vehicle.

2. ATTACHMENT OF RADIATOR

First, as shown in FIG. 7B, the first extending portion 15a is inserted between the first and second holding portions 33a, 35a so that the first extending portion 15a contacts with the first holding portion 33a. Then, the radiator 10 is moved to contact with the inclining member 33 so that an extending end of the second extending portion 15b contacts with the sandwiched portion 33b, through an operation OP1 shown in FIG. 7B.

Next, the radiator 10 is made stand straight through an operation OP2 shown in FIG. 7B. The side plate 14 is secured to the second bracket 40 through the bolt 50, thereby restricting the radiator 10 from being inclined in the front-rear direction of the vehicle. As a result, the sandwiched portion 33b is sandwiched between the second extending portion 15b and the bracket main portion 35. At the same time, the first extending portion 15a is sandwiched and is held between the first and second holding portions 33a, 35a. As a result, the protruding portions 36a and 36b of the side plate 15 are respectively engaged with the engaging groove 37a and the engaging hole 37b, thereby firmly fastening the radiator 10 to the first bracket 30. Thus, the radiator 10 is firmly attached to the vehicle.

According to the first embodiment, the radiator 10 is readily detached from and is readily attached to the vehicle, and a space for detaching and attaching the radiator 10 can be made smaller. Further, the inclining portion 33 is formed to be naturally inclined with respect the vertical direction when the radiator 10 is detached from the first and second brackets 30, 40. Therefore, when the radiator 10 is attached to the first and second brackets 30, 40 again after being detached, the first extending portion 15a is readily inserted between the first and second holding portions 33a, 35a, thereby further facilitating attachment of the radiator 10 to the vehicle.

Figure 9:
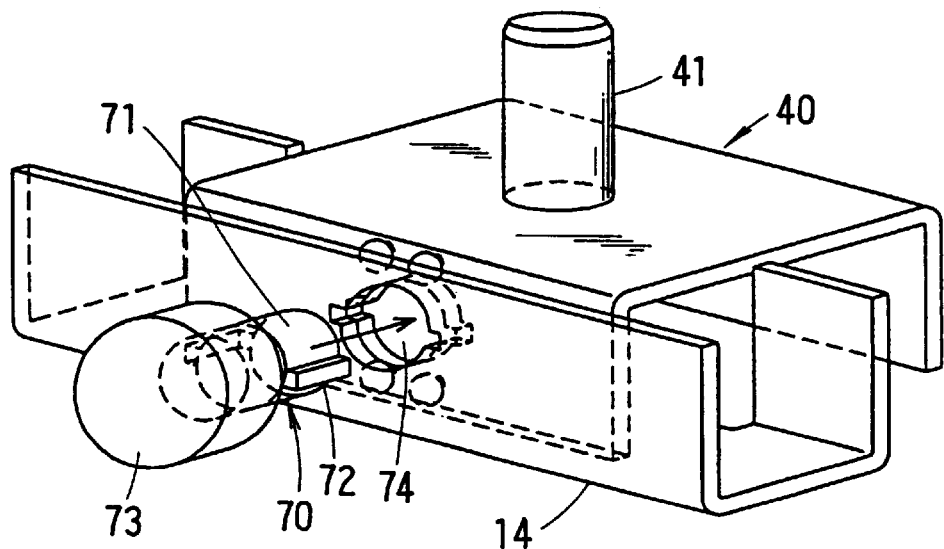
FIG. 9 is a perspective view showing a second bracket and a side plate according to a second preferred embodiment of the present invention.

A second preferred embodiment of the present invention will be described with reference to FIG. 9. In this and following embodiments, components which are similar to those in the first embodiment are indicated with the same reference numerals, and the explanation thereof is omitted.

In the above-described first embodiment, the bolt 50 restricts the movement of the radiator 10. However, in the second embodiment, the side plate 14 and the second bracket 40 are fastened through a key-like pin 70, thereby restricting the radiator 10 from inclining when the radiator 10 is attached to the vehicle. The pin 70 includes a cylindrical pin portion 71, a protruding portion 72 outwardly protruding from an outer circumferential surface of the pin portion 71, and a cylindrical large-diameter portion 73 having a diameter larger than that of the pin portion 71. The pin 70 is inserted into a keyhole 74 formed in the side plate 14 and is turned, thereby fastening the side plate 14 and the second bracket 40 between the protruding portion 72 and the large-diameter portion 73. In the second embodiment, the same effect as in the first embodiment is obtained.

Figure 10A:
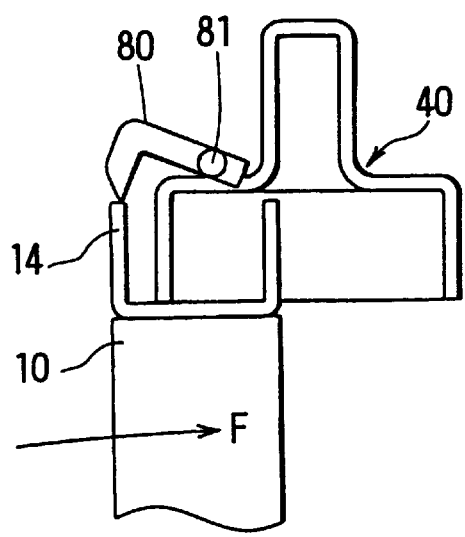
FIG. 10A is a schematic sectional view showing a second bracket and a side plate when an engaging hook is not engaged.
Figure 10B:
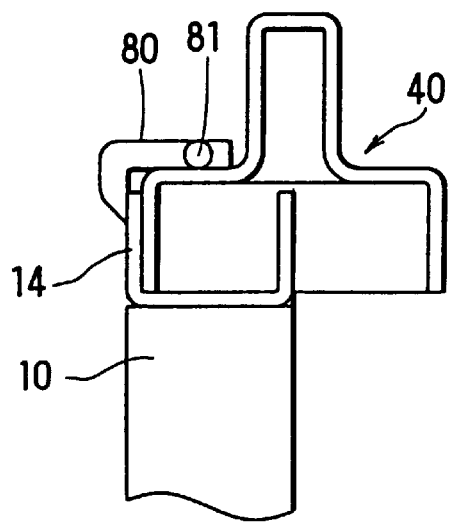
FIG. 10B is a schematic sectional view showing the second bracket and the side plate when the engaging hook is engaged according to a third preferred embodiment of the present invention.

A third preferred embodiment of the present invention will be described with reference to FIGS. 10A, 10B. FIG. 10A shows a detachment state or an attachment state of the radiator 10. In FIG. 10A, when force F is applied to the radiator 10 as shown by arrow F, the radiator 10 is attached as shown in FIG. 10B. In the third embodiment, a L-shaped hook 80 is used to restrict the radiator 10 from inclining when the radiator 10 is attached to the vehicle. The hook 80 is maintained to be engaged with the side plate 14 and the second bracket 40 by a torsion spring 81. In the third embodiment, the same effect as in the first and second embodiments is obtained.

A fourth preferred embodiment of the present invention will be described with reference to FIGS. 11–16.

Figure 11:
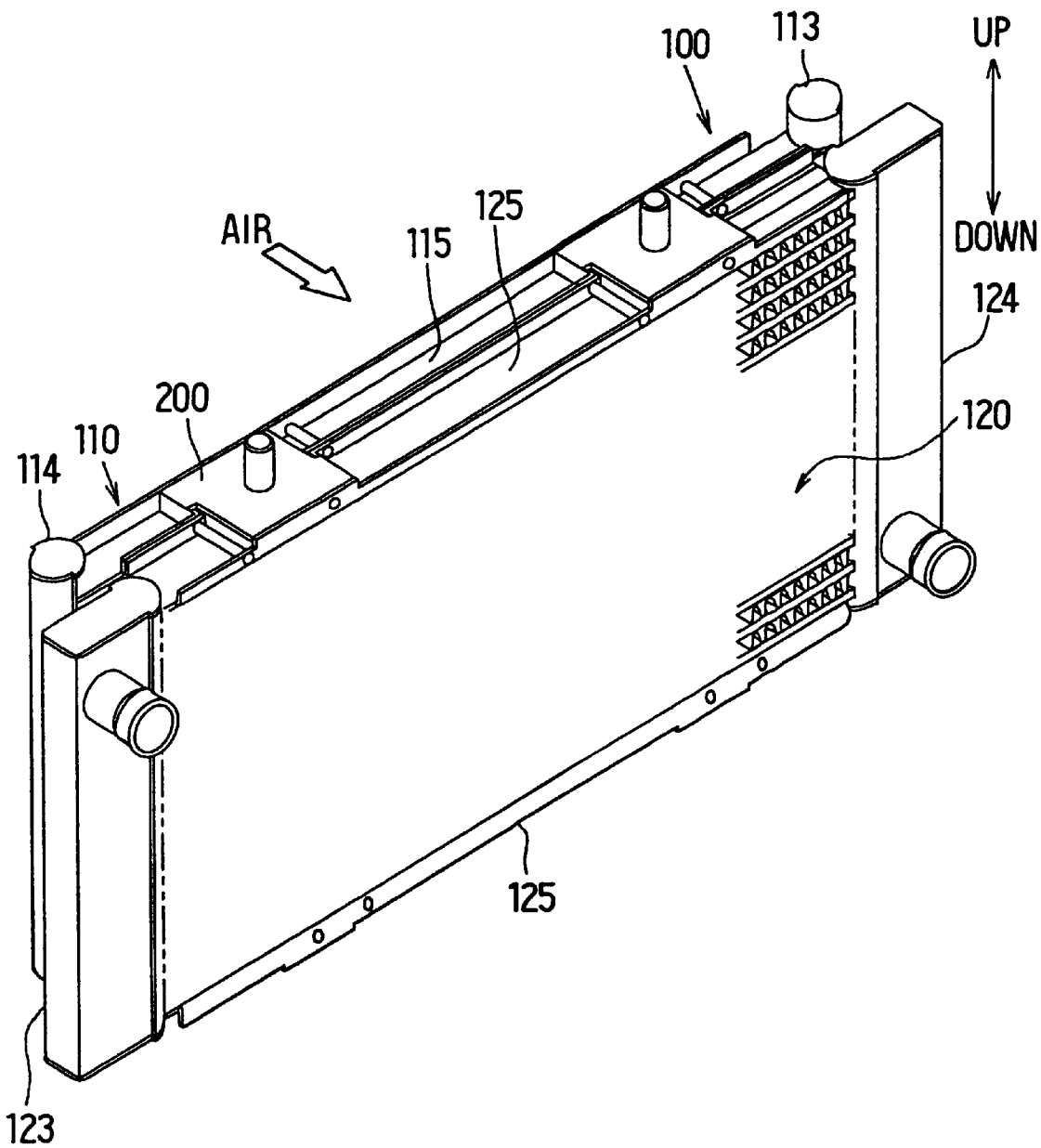
FIG. 11 is a perspective view showing a radiator and a condenser for a vehicle according to a fourth preferred embodiment of the present invention.

As shown in FIG. 11, a condenser 110 for cooling refrigerant of a refrigerant cycle in an air conditioner for a vehicle and a radiator 120 for cooling water of the engine are integrally connected with each other to form a double heat exchanger 100.

Figure 12:
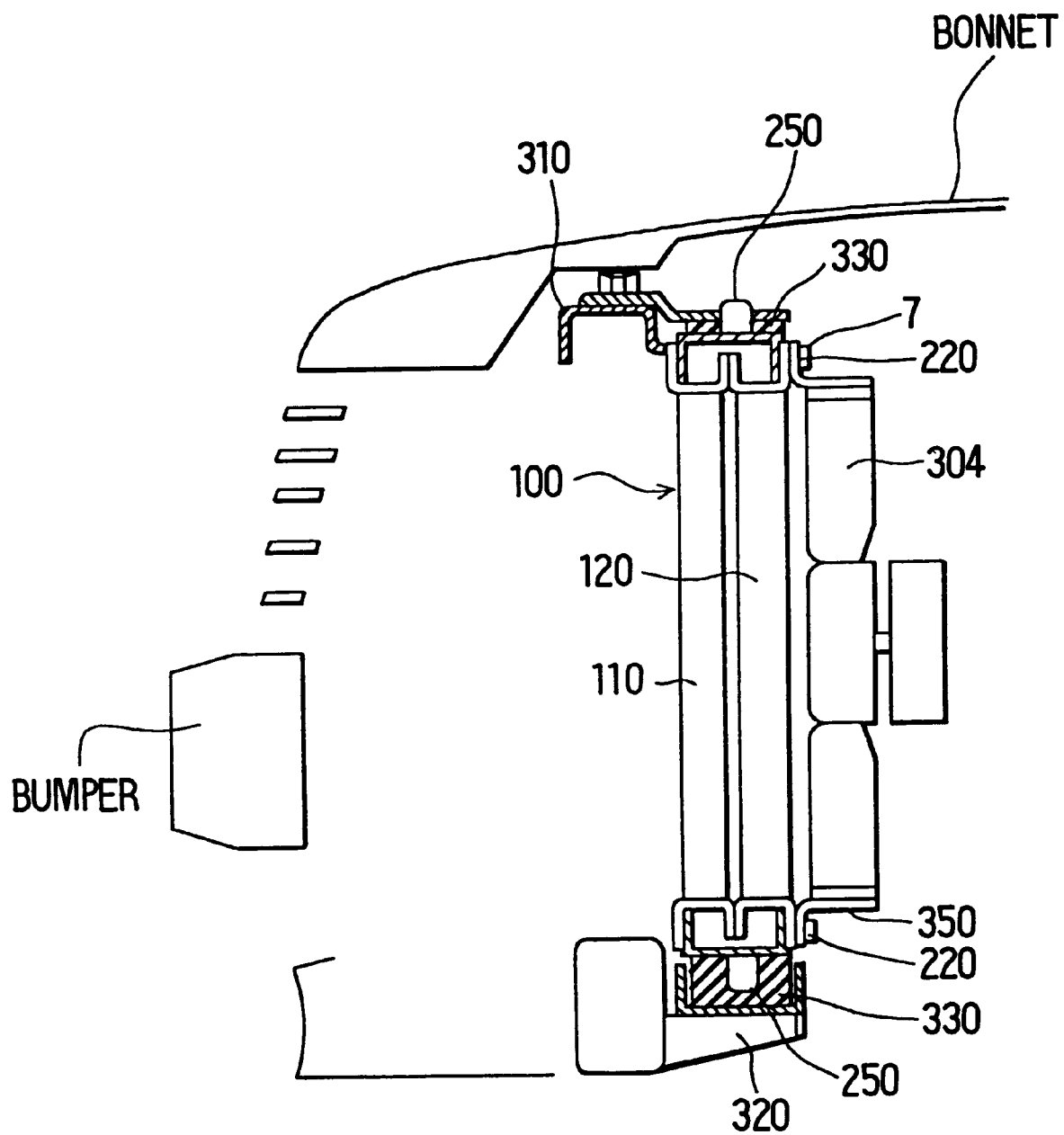
FIG. 12 is a schematic view showing the radiator and the condenser mounted on the vehicle according to the fourth embodiment.

As shown in FIG. 12, the double heat exchanger 100 is disposed in a vehicle front side of an engine compartment adjacent to a front grille (not shown). Since a temperature of refrigerant is generally lower than that of cooling water of the engine, the condenser 110 is disposed on an upstream air side of the radiator 120.

Figure 13:
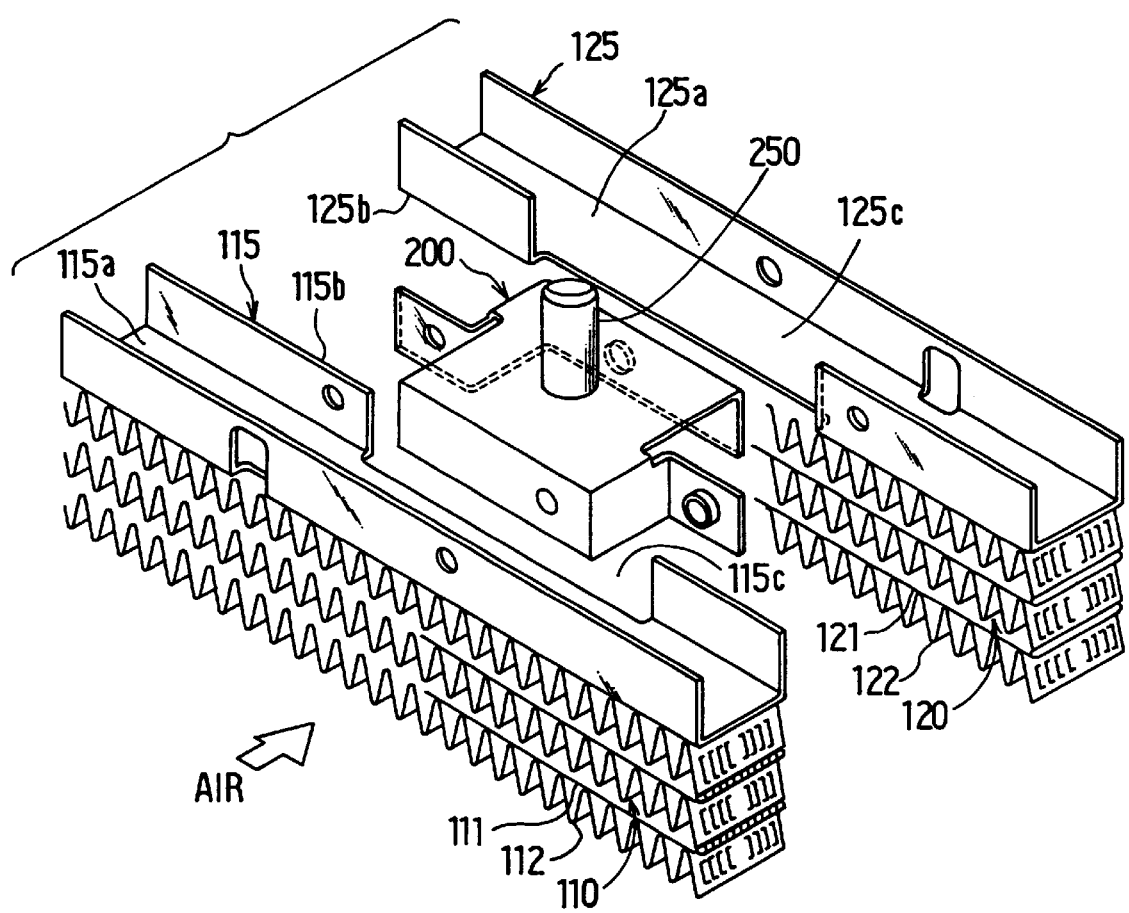
FIG. 13 is a disassembled perspective view showing the radiator, the condenser and a bracket according to the fourth embodiment.

As shown in FIG. 13, the condenser 110 includes plural flat tubes 111 through which refrigerant flows and plural fins 112 disposed between adjacent flat tubes 111 to facilitate heat exchange between refrigerant and air. The radiator 120 includes plural flat tubes 121, through which cooling water of the engine flows and plural fins 122 disposed between adjacent flat tubes 121 to facilitate heat exchange between cooling water of the engine and air.

Further, as shown in FIG. 11, a header tank 113 for distributing refrigerant is disposed on one end of each tube 111 in the longitudinal direction of the tubes 111, and a header tank 114 for collecting refrigerant having performed heat exchange is disposed on the other end of each tube 111 in the longitudinal direction. Similarly, a header tank 123 for distributing cooling water is disposed on one end of each tube 121 in the longitudinal direction, and a header tank 124 for collecting cooling water having performed heat exchange is disposed on the other end of each tube 121 in the longitudinal direction. The tubes 111, the fins 112 and the tanks 113, 114 of the condenser 110 are connected with each other by brazing. Similarly, the tubes 121, the fins 122 and the tanks 123, 124 of the radiator 120 are also connected with each other by brazing.

A first side plate 115 for reinforcing the condenser 110 is attached to each of upper and lower end surfaces of the condenser 110, and is connected to the fins 112 and the tanks 113, 114 through brazing. Similarly, a second side plate 125 for reinforcing the radiator 120 is attached to each of upper and lower end surfaces of the radiator 120, and is connected to the fins 122 and the tanks 123, 124 through brazing. As shown in FIG. 13, each of the first and second side plates 115, 125 has a U-shaped cross-section and extends in a direction perpendicular to an air-flowing direction. That is, each of the first and second side plates 115, 125 extends in a direction parallel to the longitudinal direction of the tubes 111, 121. The first and second side plates 115, 125 have bottom portions 115a, 125a contacting the fins 112, 122, respectively.

Referring to FIG. 12, the condenser 110 and the radiator 120 are fastened to an upper attachment member 310 and a lower attachment member 320 of the vehicle through the first and second side plates 115, 125 and a bracket 200. In the fourth embodiment, as shown in FIG. 11, two of the brackets 200 are provided at the upper end surfaces of the condenser 110 and the radiator 120, and two of the brackets 200 are provided at the lower end surfaces of the condenser 110 and the radiator 120. Thus, four of the brackets 200 are totally used for the condenser 110 and the radiator 120 in the fourth embodiment. The condenser 110 and the radiator 120 are elastically held by the upper and lower attachment members 310, 320 through an elastic member 330 made of rubber or the like. That is, the condenser 110 and the radiator 120 are mounted on the upper and lower attachment members 310, 320 in floating.

Figure 14:
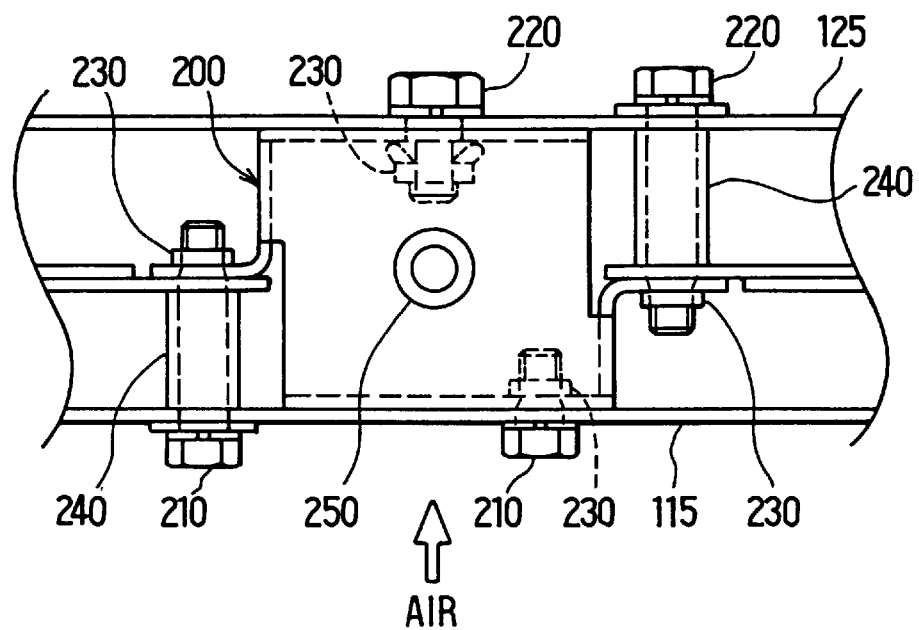
FIG. 14 is a top view showing the bracket attached to the condenser and the radiator according to the fourth embodiment.

As shown in FIG. 14, the bracket 200 is attached to the first and second side plates 115, 125 through first and second bolts 210, 220, respectively, thereby connecting the first and second side plates 115, 125 to the bracket 200. The first bolt 210 is inserted into the bracket 200 and the first side plate 115 from an upstream air side, and is screwed into a female screw portion 230 formed in the bracket 200. The second bolt 220 is inserted into the bracket 200 and the second side plate 125 from a downstream air side, and is screwed into the female screw portion 230 formed in the bracket 200.

Further, as shown in FIG. 13, the first and second side plates 115, 125 have side-wall portions 115b, 125b extending from the bottom portions 115a, 125a, respectively. Each of the side-wall portions 115b, 125b is cut off at a position where the bracket 200 is attached, thereby forming recess portions 115c, 125c. The recess portions 115c, 125c respectively prevent the side plates 115, 125 from interfering with the bracket 200.

Referring to FIG. 14, a cylindrical collar 240 is provided to prevent the side plates 115, 125 from being deformed when the first and second bolts 210, 220 are tightened. An insertion pin 250 is inserted into the elastic member 330, thereby connecting the bracket 200 to the elastic member 330. Further, as shown in FIGS. 12, 14, the second bolt 220 without the collar 240, i.e., the second bolt 220 adjacent to the insertion pin 250, is also used for connecting a blower 340 for blowing air toward the condenser 110 and the radiator 120 and a shroud 350 for covering a gap between the blower 340 and the radiator 120 to the radiator 120.

According to the fourth embodiment of the present invention, the first and second side plates 115, 125 respectively have the recess portions 115c, 125c for preventing interference between the bracket 200 and the first and second side plates 115, 125. Therefore, when the first and second bolts 210, 220 are removed, the condenser 110 and the radiator 120 can be moved in an air-flowing direction.

Figure 15:
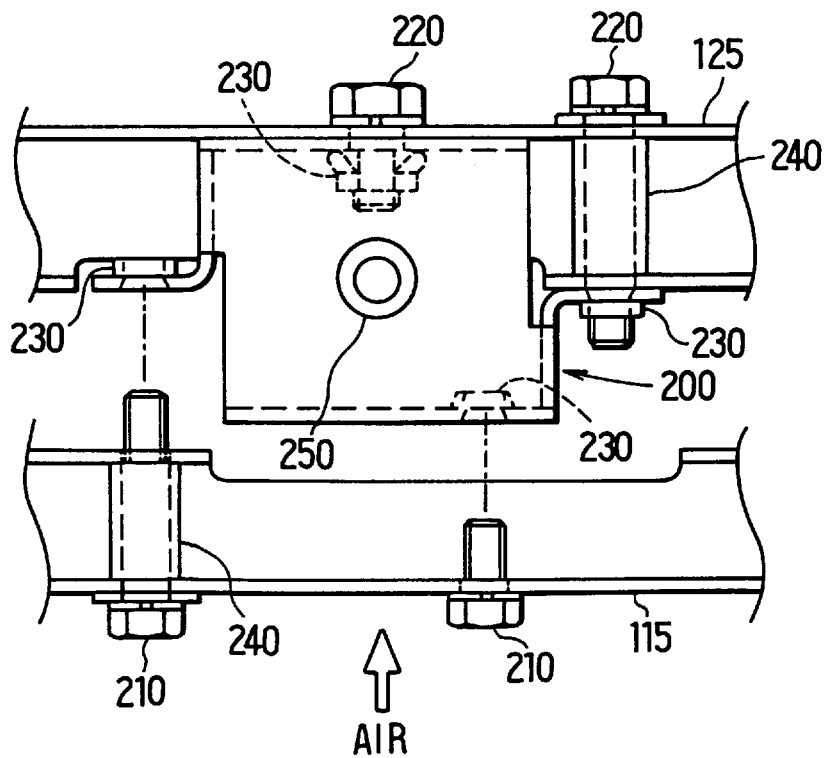
FIG. 15 is a top view showing the condenser detached from the radiator and the bracket according to the fourth embodiment.
Figure 18:
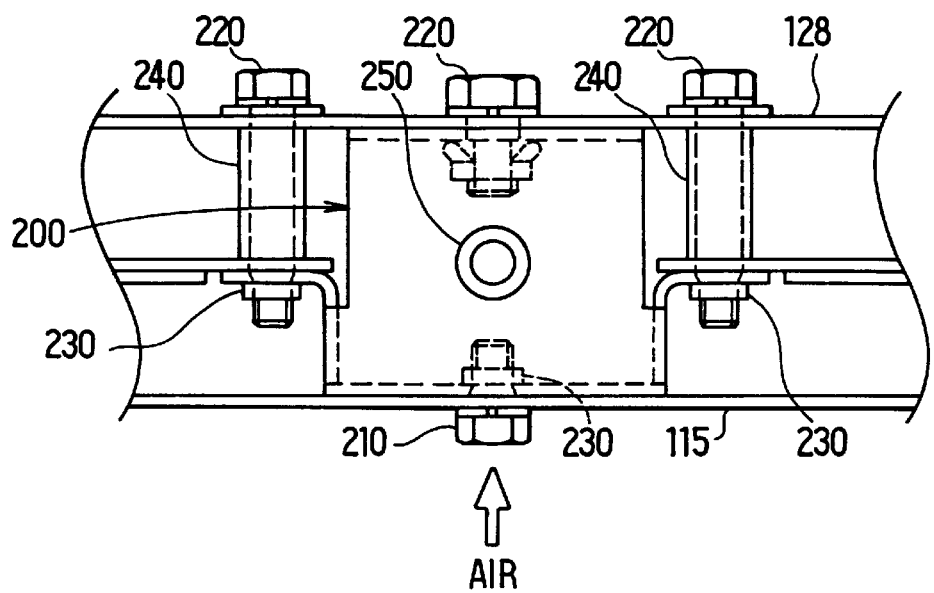
FIG. 18 is a top view showing the bracket attached to the condenser and the radiator according to the fifth embodiment.

As a result, as shown in FIG. 15, when the first bolt 210 is removed, the condenser 110 can be moved toward the upstream air side of the bracket 200, thereby enabling only the condenser 110 to be detached from the vehicle. On the other hand, as shown in FIG. 16, when the second bolt 220 is removed, the radiator 120 can be moved toward the downstream air side of the bracket 200, thereby enabling only the radiator 120 to be detached from the vehicle.

Thus, in the fourth embodiment, when only one of the condenser 110 and the radiator 120 needs to be detached from the vehicle, the other one of the condenser 110 and the radiator 120 does not need to be detached from the vehicle, thereby improving maintenance efficiency of the heat exchanger. Further, the first bolt 210 is inserted from the upstream air side and the second bolt 220 is inserted from the downstream air side. Therefore, the first and second bolts 210, 220 are readily tightened firmly.

Figure 19:
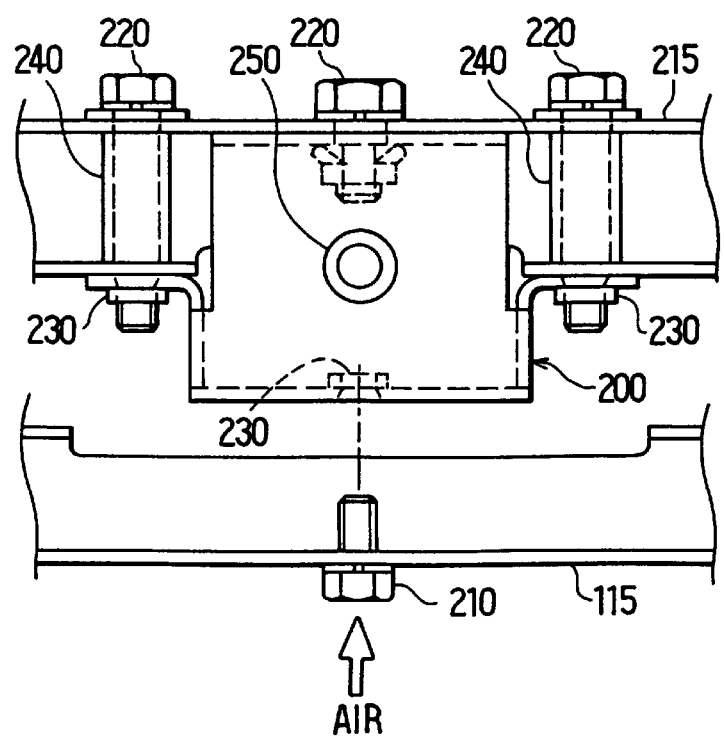
FIG. 19 is a top view showing the condenser detached from the radiator and the bracket according to the fifth embodiment.
Figure 20:
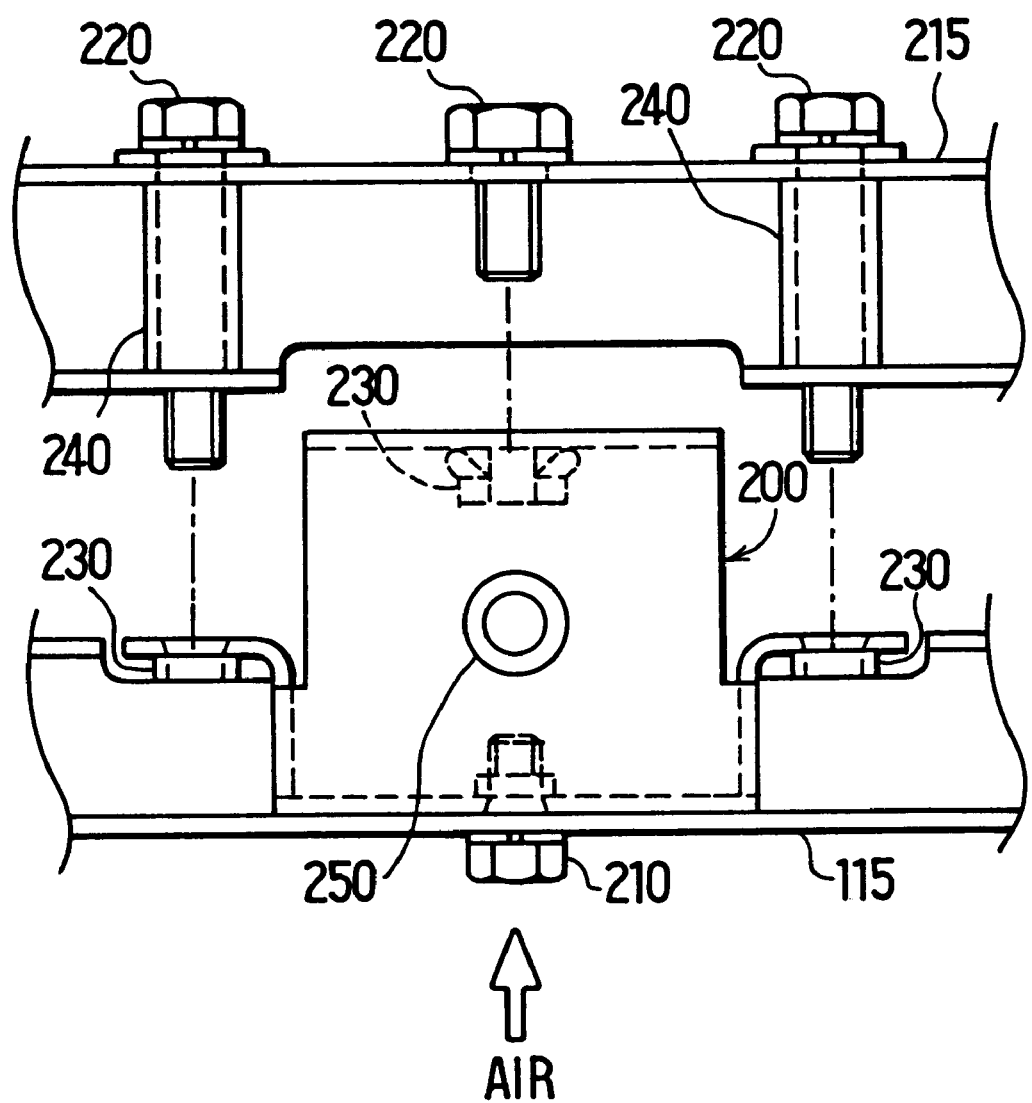
FIG. 20 is a top view showing the radiator detached from the condenser and the bracket according to the fifth embodiment.

A fifth preferred embodiment of the present invention will be described with reference to FIGS. 17–20. In the above-described fourth embodiment, both the first bolts 210 and both the second bolts 220 are respectively used. However, in the fifth embodiment, only one first bolt 210 is used, and three second bolts 220 are used. FIG. 19 shows a state where the condenser 110 is detached from the bracket 200. FIG. 20 shows a state where the radiator 120 is detached from the bracket 200. In the fifth embodiment, the same effect in the fourth embodiment is obtained.

Although the present invention has been fully described in connection with preferred embodiments thereof with reference to the accompanying drawings, it is to be noted that various changes and modifications will become apparent to those skilled in the art.

In the above-described first to third embodiments, the attachment structure of the present invention is typically applied to the radiator 10. However, the attachment structure of the present invention may also be applied to the condenser 20, and any other heat exchanger.

In the above-described first embodiment, the inclining member 33 may be elastically deformable with respect to the bracket main portion 35 so that the inclining member 33 is inclined in the front-rear direction of the vehicle through elastic deformation.

In the above-described first embodiment, the first bracket 30 is connected to the side plates 15, 25 disposed at lower sides of the radiator 10 and the condenser 20, and the second bracket 40 is connected to the side plates 14, 24 disposed at the upper sides of the radiator 10 and the condenser 20. However, the first bracket 30 may be connected to the side plates 14, 24 disposed at the upper side of the radiator 10 and the condenser 20, and the second bracket 40 may be connected to the side plates 15, 25 disposed at the upper sides of the radiator 10 and the condenser 20.

In the above-mentioned fourth and fifth embodiments, the first and second bolts 210, 220 are inserted into the bracket 200 in the air-flowing direction. However, the first and second bolts 210, 220 may be inserted into the bracket 200 in a vertical direction approximately perpendicular to the airflowing direction.

In the above-mentioned fourth and fifth embodiments, the female screw portions 230 may be omitted when the first and second bolts 210, 220 are connected with nut portions provided in the bracket 200.

Each of the above-mentioned first to fifth embodiments of the present invention is not limited to a double heat exchanger having a condenser and a radiator connected with each other and mounted on the vehicle, but may also be applied to any other double heat exchanger.

In the above-mentioned fourth and fifth embodiments, the recess portions 115c, 125c may be omitted when the bracket 200 is pinched and held between the first and second side plates 115, 125 in the air-flowing direction. In this case, when the first and second bolts 210, 220 are removed, the condenser 110 and the radiator 120 can be moved in the air-flowing direction.

In the above-mentioned fourth and fifth embodiments, the brackets 200 disposed at the lower end of the condenser 110 and the radiator 120 may have a structure similar to that of the first bracket 30 described in the first embodiment. That is, a lower bracket connecting to the side plates at the lower side of the radiator and the condenser may be formed similarly to that in the first embodiment, and an upper bracket connecting to the side plates at the upper side of the radiator and the condenser may be formed similarly to that in the fourth embodiment.

Such changes and modifications are to be understood as being within the scope of the present invention as defined by the appended claims.

What is claimed is:

1. A double heat exchanger being secured to an attachment member and including a first heat exchanger and a second heat exchanger disposed at a downstream air side of said first heat exchanger, said double heat exchanger comprising:

a first side plate disposed at an end of said first heat exchanger for reinforcing said first heat exchanger;

a second side plate disposed at an end of said second heat exchanger for reinforcing said second heat exchanger, said second side plate being disposed adjacent to said first side plate;

a bracket for securing said first and second heat exchangers to the attachment member through said first and second side plates;

a first bolt through which said bracket and only said first side plate are connected;

a second bolt through which said bracket and only said second side plate are connected, wherein:

said first side plate is capable of being moved toward an upstream air side of said bracket, when said first bolt is removed while said bracket is secured to the attachment member; and said second side plate is capable of being moved toward a downstream air side of said bracket, when said second bolt is removed while said bracket is secured to the attachment member.

2. The double heat exchanger according to claim 1, wherein:

each of said first and second side plates has a substantially U-shaped cross-section and extends in a direction perpendicular to an air-flowing direction; and each of said first and second side plates has a recessed wall portion for restricting said first and second side plates from interfering with said bracket.

3. The double heat exchanger according to claim 1, wherein:

said first bolt is inserted into said bracket and said first side plate from an upstream air side; and said second bolt is inserted into said bracket and said second side plate from a downstream air side.

4. The double heat exchanger according to claim 1, wherein said bracket has a female screw portion for engaging with said first and second bolts.

5. The double heat exchanger according to claim 1, wherein said first and second side plates are disposed at the upper ends of said first and second heat exchangers, respectively.

* * * * *